(12) United States Patent
Mossington et al.

(10) Patent No.: US 12,447,884 B2
(45) Date of Patent: Oct. 21, 2025

(54) VEHICLE HEADREST ASSEMBLY WITH CONFIGURABLE SPEAKER MODULES AND CONTROL FOR MULTIPLE AUDIO MODES

(71) Applicant: HARMAN INTERNATIONAL INDUSTRIES, INCORPORATED, Stamford, CT (US)

(72) Inventors: David Mossington, Rochester, MI (US); Tingli Cai, Ann Arbor, MI (US); Riley Winton, Opelika, AL (US); Adam Michael Sachs, Bloomfield Township, MI (US); Christopher Ludwig, Bloomfield Hills, MI (US); Christopher Michael Trestain, Livonia, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 155 days.

(21) Appl. No.: 18/270,061

(22) PCT Filed: Dec. 30, 2021

(86) PCT No.: PCT/US2021/065782
§ 371 (c)(1),
(2) Date: Jun. 28, 2023

(87) PCT Pub. No.: WO2022/147320
PCT Pub. Date: Jul. 7, 2022

(65) Prior Publication Data
US 2024/0059201 A1 Feb. 22, 2024

Related U.S. Application Data

(60) Provisional application No. 63/132,574, filed on Dec. 31, 2020.

(51) Int. Cl.
*B60N 2/879* (2018.01)
*B60N 2/00* (2006.01)
(Continued)

(52) U.S. Cl.
CPC ............. *B60N 2/879* (2018.02); *H04R 5/023* (2013.01); *H04R 2499/13* (2013.01)

(58) Field of Classification Search
CPC . H04R 2499/13; B60N 2/879; B60R 11/0217; B60R 2011/0017
See application file for complete search history.

(56) References Cited

U.S. PATENT DOCUMENTS

| 4,042,791 A | 8/1977 | Wiseman |
| 4,310,307 A | 1/1982 | Bellisario |

(Continued)

FOREIGN PATENT DOCUMENTS

| CN | 108284807 A | 7/2018 |
| CN | 109691126 A | 4/2019 |

(Continued)

OTHER PUBLICATIONS

Non-Final Office Action for U.S. Appl. No. 18/267,254, dated Feb. 12, 2025, 15 pages.

(Continued)

*Primary Examiner* — Shin H Kim
(74) *Attorney, Agent, or Firm* — Brooks Kushman P.C.

(57) ABSTRACT

A headrest assembly for a vehicle includes a head support having a front side, a back side, a left side, and a right side. A left support arm is coupled to the left side and aright support aim is coupled to the right side. A left speaker module is coupled to the left support arm and a right speaker module is coupled to the right support arm, the left and right speaker modules each including a housing having a front face with at least one speaker mounted therein for generating (Continued)

audio output. The left and right support arms are arranged to position the left and right speaker modules in a retracted position with respect to the head support to provide a surround sound mode, a first extended position to provide an individual sound zone (ISZ) mode, and a second extended position to provide a binaural mode.

20 Claims, 8 Drawing Sheets

(51) Int. Cl.
  *B60N 2/90* (2018.01)
  *H04R 5/02* (2006.01)

(56) References Cited

U.S. PATENT DOCUMENTS

| | | | |
|---|---|---|---|
| 4,758,047 | A | 7/1988 | Hennington |
| 5,370,446 | A | 12/1994 | Bancod |
| 5,997,091 | A | 12/1999 | Rech et al. |
| 6,744,898 | B1 | 6/2004 | Hirano |
| 8,950,813 | B2 | 2/2015 | Nawaz |
| 8,985,622 | B1 | 3/2015 | Cannon |
| 9,338,554 | B2 * | 5/2016 | Christoph .............. H04S 7/301 |
| 9,357,304 | B2 * | 5/2016 | Christoph .............. H04S 1/00 |
| 9,555,890 | B2 | 1/2017 | Tracy |
| 10,239,432 | B2 | 3/2019 | Subat et al. |
| 10,440,455 | B2 | 10/2019 | Fox |
| 10,457,179 | B1 | 10/2019 | Kentley-Klay |
| 2003/0142842 | A1 | 7/2003 | Arai et al. |
| 2009/0206641 | A1 | 8/2009 | Brown, Jr. |
| 2010/0148550 | A1 | 6/2010 | Kidd |
| 2011/0081038 | A1 | 4/2011 | Tracy |
| 2015/0043736 | A1 * | 2/2015 | Olsen .................. H04S 7/30 381/17 |
| 2015/0117668 | A1 | 4/2015 | Niss |
| 2016/0023763 | A1 | 1/2016 | Tracy |
| 2016/0057520 | A1 | 2/2016 | Barksdale et al. |
| 2017/0085990 | A1 * | 3/2017 | Sladeczek .............. H04S 7/302 |
| 2017/0106775 | A1 | 4/2017 | Takada et al. |
| 2017/0214988 | A1 | 7/2017 | Ferretti et al. |
| 2018/0198541 | A1 | 7/2018 | Harris et al. |
| 2019/0106039 | A1 | 4/2019 | Winton et al. |
| 2019/0176670 | A1 | 6/2019 | Scott et al. |
| 2019/0182593 | A1 | 6/2019 | Guerrini et al. |
| 2019/0202330 | A1 | 7/2019 | Subat et al. |
| 2020/0128312 | A1 | 4/2020 | Christoph et al. |
| 2020/0189436 | A1 | 6/2020 | Soltner |
| 2021/0266661 | A1 * | 8/2021 | Winton .................. B60K 35/80 |
| 2022/0353614 | A1 * | 11/2022 | Cai ........................ H04R 5/02 |
| 2024/0059201 | A1 * | 2/2024 | Mossington ........... H04R 5/023 |
| 2024/0064446 | A1 * | 2/2024 | Doberstein ......... B60R 11/0217 |
| 2025/0080910 | A1 | 3/2025 | Sakamoto et al. |

FOREIGN PATENT DOCUMENTS

| | | |
|---|---|---|
| CN | 109866664 A | 6/2019 |
| CN | 110049901 A | 7/2019 |
| CN | 110194086 A | 9/2019 |
| CN | 110936871 A | 3/2020 |
| CN | 111065033 A | 4/2020 |
| CN | 111319530 A | 6/2020 |
| DE | 102014210105 A1 | 12/2015 |
| DE | 102017215978 A1 | 3/2019 |
| FR | 3114274 A1 | 3/2022 |
| JP | S6152538 U | 4/1986 |
| JP | 2005159914 A | 6/2005 |
| KR | 20060090041 A | 8/2006 |
| KR | 100629806 B1 | 10/2006 |
| WO | 2004064369 A2 | 7/2004 |

OTHER PUBLICATIONS

Extended European Search Report for Application No. 21916551.1, dated Oct. 17, 2024, 9 pages.
International Search Report and Written Opinion for Application No. PCT/US2021/065782, dated Mar. 24, 2022, 9 pages.
International Preliminary Report on Patentability for Application No. PCT/US2021/065782, dated Jul. 13, 2023, 8 pages.
International Search Report and Written Opinion for Application No. PCT/US2021/065787, dated Mar. 25, 2022, 9 pages.
International Preliminary Report on Patentability for Application No. PCT/US2021/065787, dated Jul. 13, 2023, 8 pages.
International Search Report and Written Opinion for Application No. PCT/US2021/065812, dated May 5, 2022, 11 pages.
International Preliminary Report on Patentability for Application No. PCT/US2021/065812, dated Jul. 13, 2023, 10 pages.
Extended European Search Report for Application No. 21916536.2, dated Oct. 23, 2024, 9 pages.
Extended European Search Report for Application No. 21916539.6, dated Oct. 24, 2024, 8 pages.
Non-Final Office Action for U.S. Appl. No. 18/270,136, dated Mar. 26, 2025, 19 pages.
Chinese Office Action and English translation for Application No. 202180088424.6, dated Aug. 9, 2025, 24 pages.
Chinese Office Action with English translation for Application No. 202180088421.2, dated Jul. 22, 2025, 20 pages.
Chinese Office Action with English translation for Application No. 202180088194.3, dated Jul. 22, 2025, 24 pages.

* cited by examiner

VEHICLE HEADREST ASSEMBLY WITH CONFIGURABLE SPEAKER MODULES AND CONTROL FOR MULTIPLE AUDIO MODES

CROSS-REFERENCE TO RELATED APPLICATIONS

This application is the U.S. national phase of PCT Application No. PCT/US2021/065782 filed Dec. 30, 2021, which claims the benefit of U.S. provisional application Ser. No. 63/132,574 filed Dec. 31, 2020, the disclosure of which are hereby incorporated in their entirety by reference herein.

TECHNICAL FIELD

Embodiments relate to a vehicle headrest assembly with configurable speaker modules and control for multiple audio modes.

BACKGROUND

Modern vehicle systems use a variety of speakers and speaker configurations. Sound quality and performance of vehicle sound systems are an important service of vehicles. In many existing designs, speakers are typically mounted in passenger doors or along a front or rear dash of the vehicle due to spacing and other constraints. There is a desire to improve upon the conventional vehicle configurations of four or five vehicle speakers. While typical vehicle configurations allow for fading sound to the front or back of a vehicle and for panning sound to the left or right side of a vehicle, the overall effect is to limit sound to a particular section of a vehicle from speakers having a fixed position.

Vehicle audio systems are increasingly based on a seat-based concept, which provides individual, user-preferred listening modes in each seat. These listening modes rely heavily on the arrangement of headrest speakers, particularly the placement of headrest speakers in relation to the listener's head. Different listening modes require the speakers to be arranged in different positions in relation to the listener's head in order to create the optimal acoustical effect. Other factors, such as safety and comfort, must also be considered.

SUMMARY

In one or more embodiments, a headrest assembly for a vehicle includes a head support having a front side, a back side, a left side, and a right side. A left support arm is coupled to the left side and a right support arm is coupled to the right side. A left speaker module is coupled to the left support arm and a right speaker module is coupled to the right support arm, the left and right speaker modules each including a housing having a front face with at least one speaker mounted therein for generating audio output. The left and right support arms are arranged to position the left and right speaker modules to provide a plurality of audio modes including a retracted position with respect to the head support to provide a surround sound mode, a first extended position with respect to the head support to provide an individual sound zone (ISZ) mode, and a second extended position with respect to the head support to provide a binaural mode.

In one or more embodiments, the left and right support arms are operably connected to an actuator disposed within the head support. The left and right support arms may be hinged. The head support may include a flange on each of the left and right sides, each flange having a channel along which the left and right support arms can translate. The left and right support arms may be rotatably connected to the left and right speaker modules, respectively.

In one or more embodiments, in the retracted position, the front face of the left and right speaker modules is oriented forward and generally parallel to the front side of the head support. The head support may include a recessed portion on each of the left and right sides arranged to at least partially receive the left and right speaker modules, respectively, in the retracted position. In the first extended position, the left and right speaker modules extend forward from a bottom portion of the head support with the front face of each of the left and right speaker modules oriented inward. In the second extended position, the left and right speaker modules extend forward from a middle portion of the head support with the front face of each of the left and right speaker modules oriented inward. The left and right speaker modules may each include a first speaker and a second speaker, the second speaker having a different frequency range than the first speaker.

In one or more embodiments, a headrest assembly for a vehicle includes a head support having a front side, a back side, a left side, and a right side. A left support arm is coupled to the left side and a right support arm is coupled to the right side. A left speaker module is coupled to the left support arm and a right speaker module is coupled to the right support arm, the left and right speaker modules each including a housing having a front face with at least one speaker mounted therein for generating audio output. The left and right support arms are arranged to position the left and right speaker modules in a retracted position with respect to the head support wherein the front face of the left and right speaker modules is oriented forward and generally parallel to the front side of the head support, in a first extended position with respect to the head support wherein the left and right speaker modules extend forward from a bottom portion of the head support with the front face of each of the left and right speaker modules oriented inward, and in a second extended position with respect to the head support wherein the left and right speaker modules extend forward from a middle portion of the head support with the front face of each of the left and right speaker modules oriented inward.

In one or more embodiments, an audio system for a vehicle includes at least one headrest assembly including a head support having a front side, a back side, a left side, and a right side. A left support arm is coupled to the left side and a right support arm is coupled to the right side. A left speaker module is coupled to the left support arm and a right speaker module is coupled to the right support arm, the left and right speaker modules each including a housing having a front face with at least one speaker mounted therein for generating audio output. The audio system further includes a vehicle control unit in electrical communication with the at least one headrest assembly, the vehicle control unit configured to position the left and right speaker modules to provide a plurality of audio modes including a retracted position with respect to the head support to provide a surround sound mode, a first extended position with respect to the head support to provide an ISZ mode, and a second extended position with respect to the head support to provide a binaural mode.

In one or more embodiments, the vehicle control unit includes a user interface configured to generate a control signal for movement of the left and right support arms and coupled left and right speaker modules in response to user input selecting one of the plurality of audio modes. An actuator may be disposed within the head support and operably connected to the left and right support arms, the actuator in electrical communication with the vehicle control unit for causing movement of the left and right support arms. The vehicle control unit may be capable of controlling the left speaker module independent from the right speaker module. The vehicle control unit may be arranged to position the left and right support arms and coupled left and right speaker modules based on a vehicle parameter including at least one of vehicle shutdown, vehicle operational mode, occupant detection, or driving condition.

DETAILED DESCRIPTION

Figure 1:
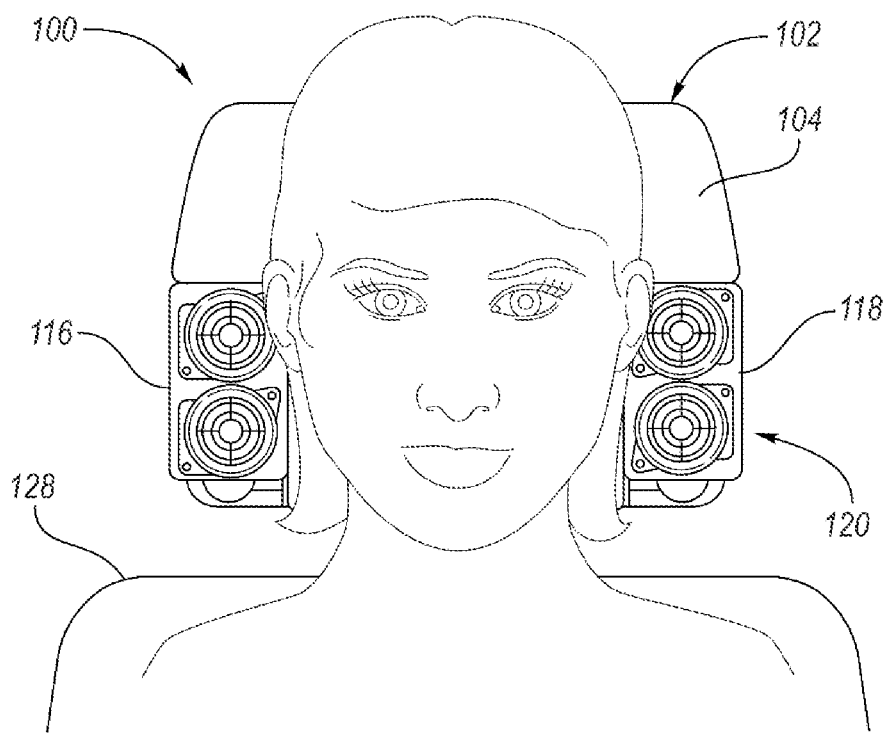
FIG. 1 illustrates a front view of a headrest assembly with speaker modules in a retracted position with respect to the head support according to one or more embodiments, such as to provide a surround sound audio mode.
Figure 2:
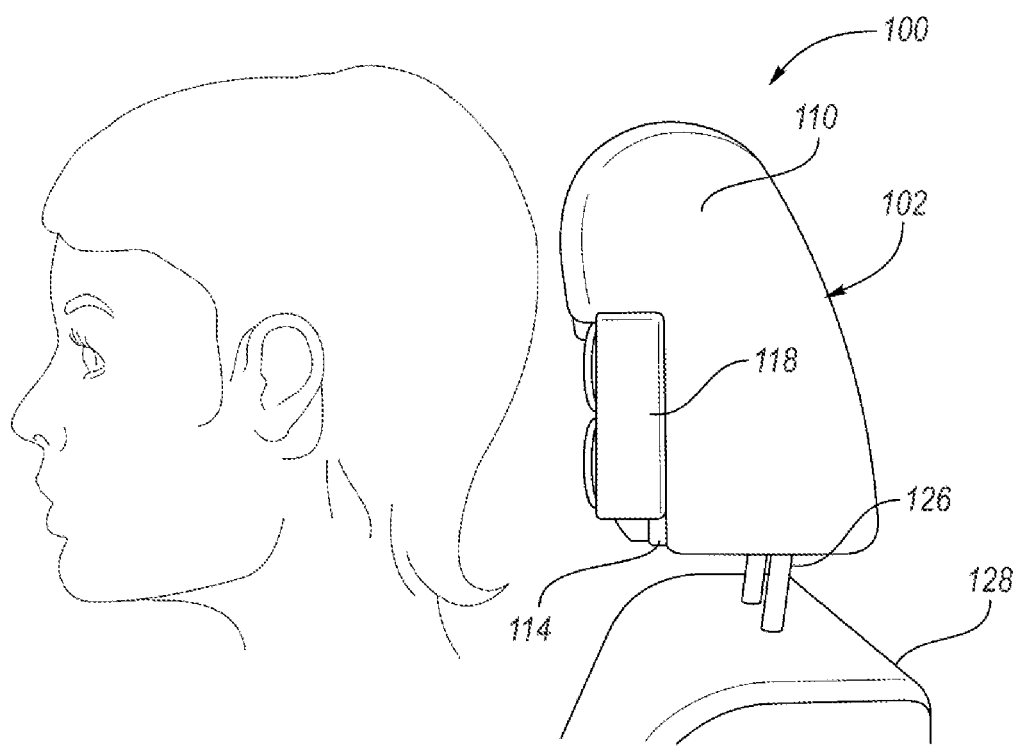
FIG. 2 illustrates a side view of the headrest assembly and retracted position of the speaker modules of FIG. 1.
Figure 3:
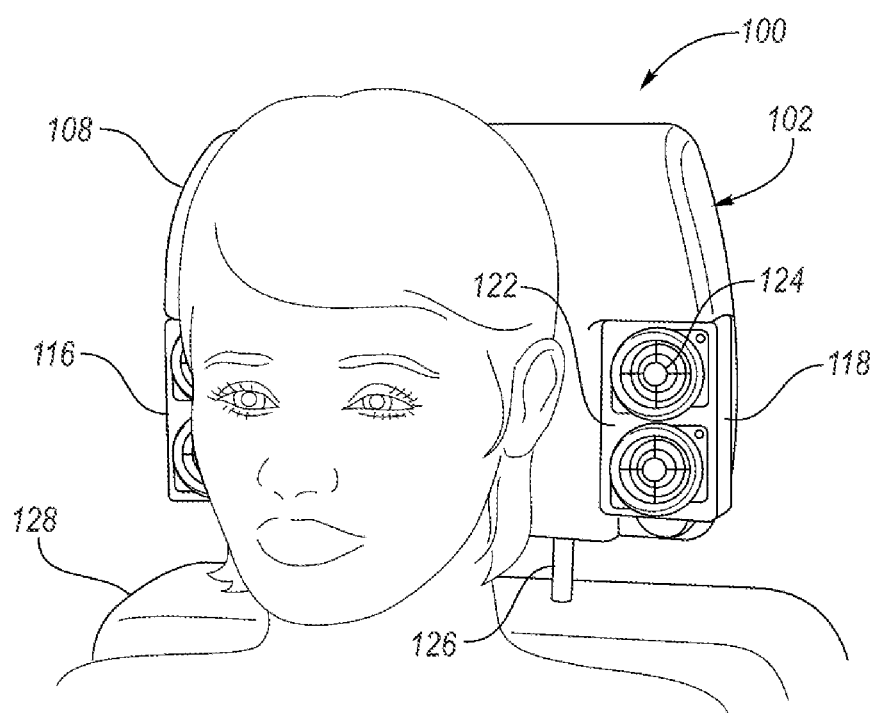
FIG. 3 illustrates a front perspective view of the headrest assembly and retracted position of the speaker modules of FIG. 1.
Figure 4:
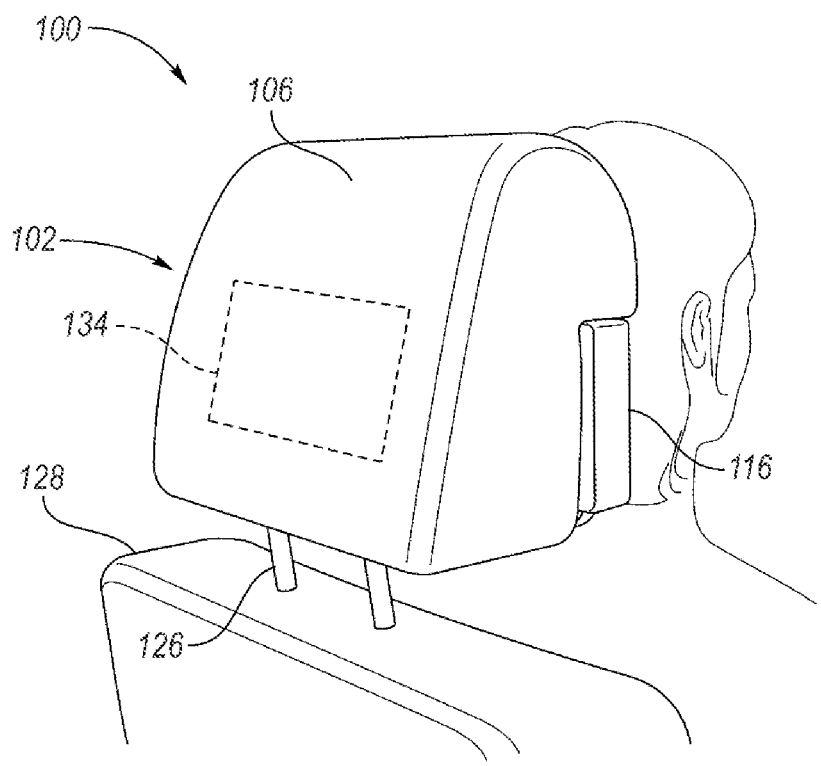
FIG. 4 illustrates a rear perspective view of the headrest assembly and retracted position of the speaker modules of FIG. 1.
Figure 5:
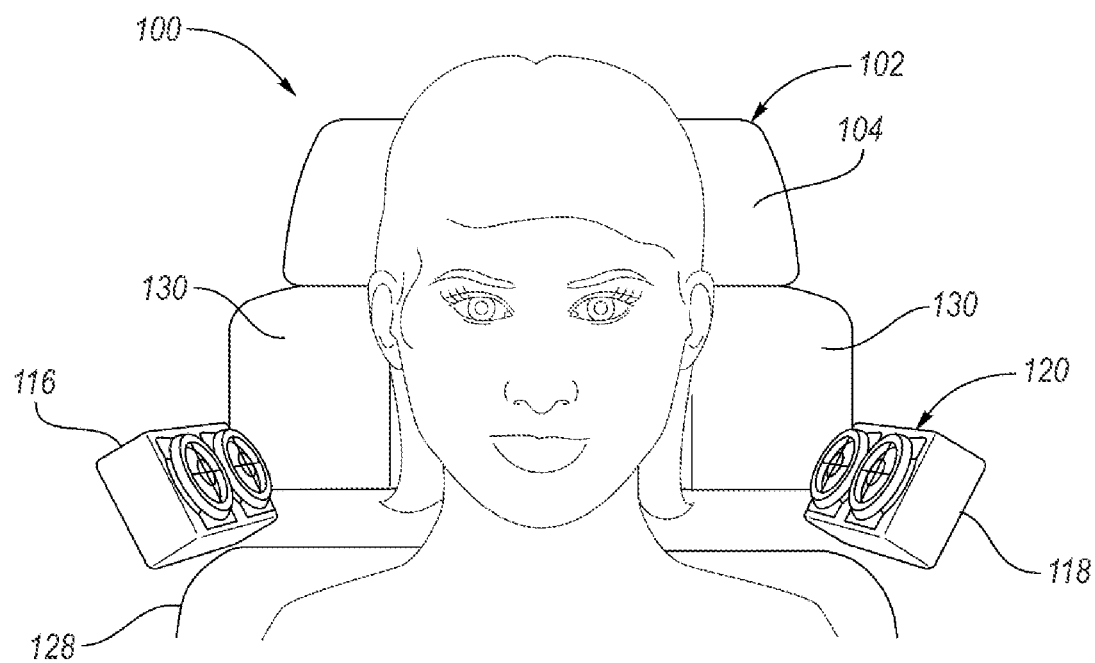
FIG. 5 illustrates a front view of a headrest assembly with speaker modules in a first extended position with respect to the head support according to one or more embodiments, such as to provide an Individual Sound Zone (ISZ) audio mode.
Figure 6:
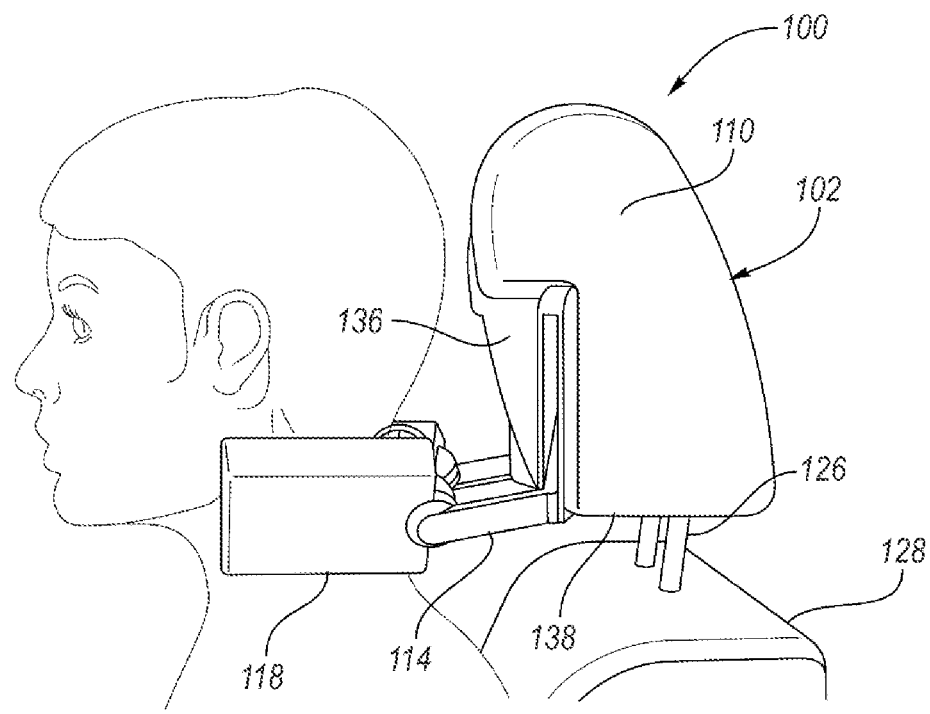
FIG. 6 illustrates a side view of the headrest assembly and first extended position of the speaker modules of FIG. 5.
Figure 7:
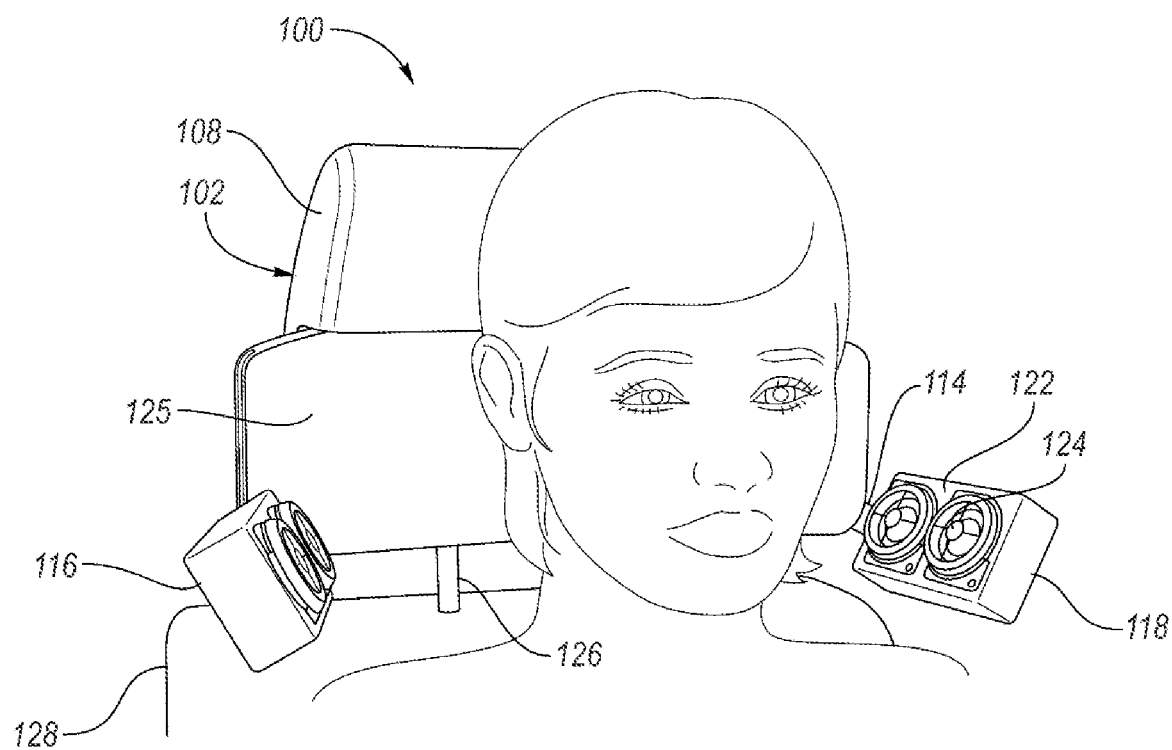
FIG. 7 illustrates a front perspective view of the headrest assembly and first extended position of the speaker modules of FIG. 5.
Figure 8:
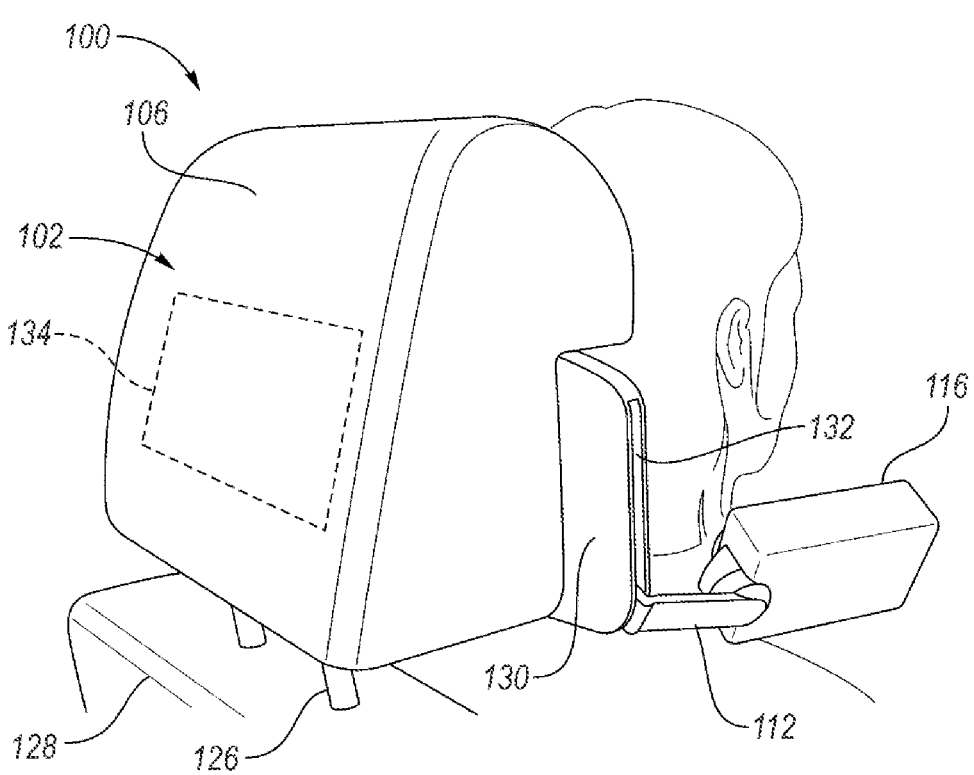
FIG. 8 illustrates a rear perspective view of the headrest assembly and first extended position of the speaker modules of FIG. 5.
Figure 9:
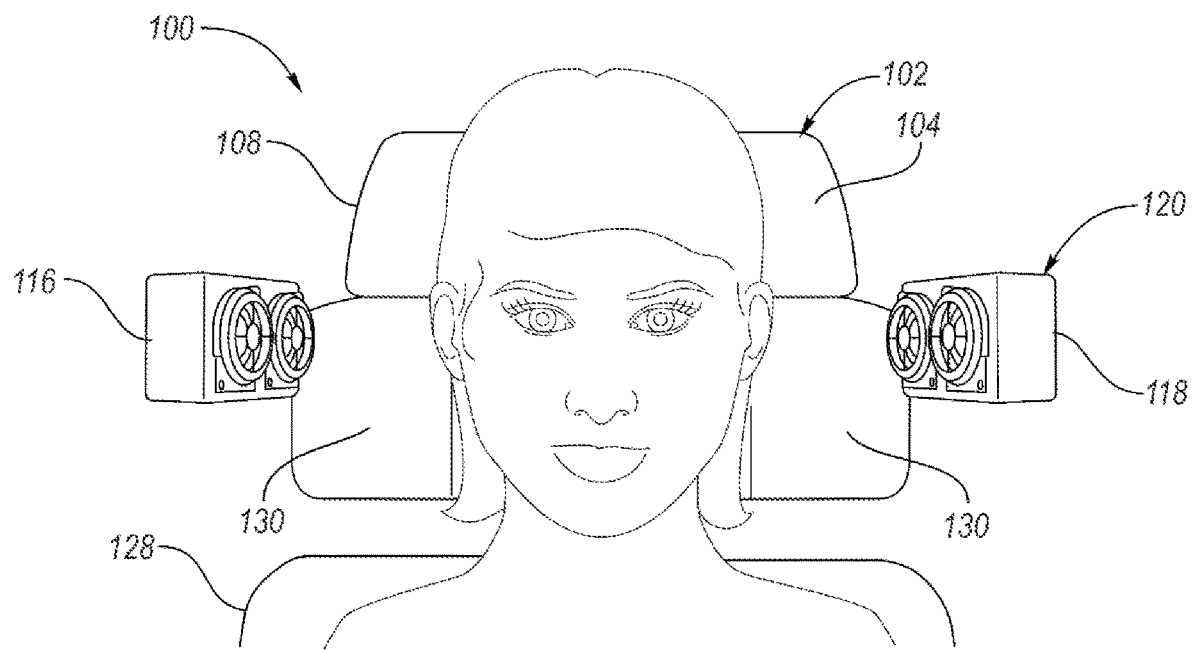
FIG. 9 illustrates a front view of a headrest assembly with speaker modules in a second extended position with respect to the head support according to one or more embodiments, such as to provide a binaural audio mode.
Figure 10:
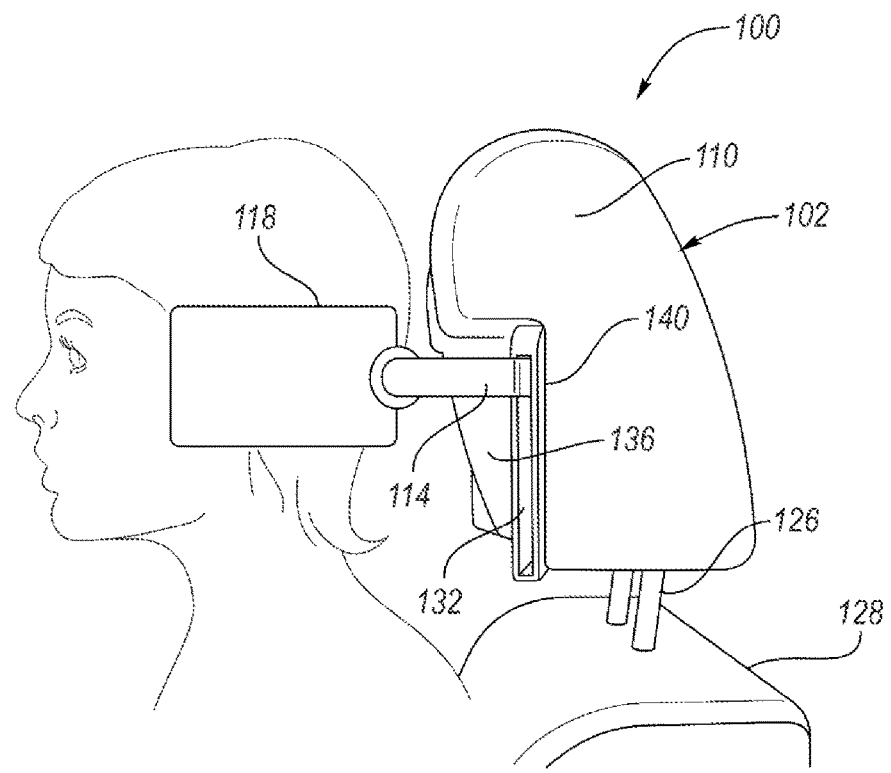
FIG. 10 illustrates a side view of the headrest assembly and second extended position of the speaker modules of FIG. 9.
Figure 11:
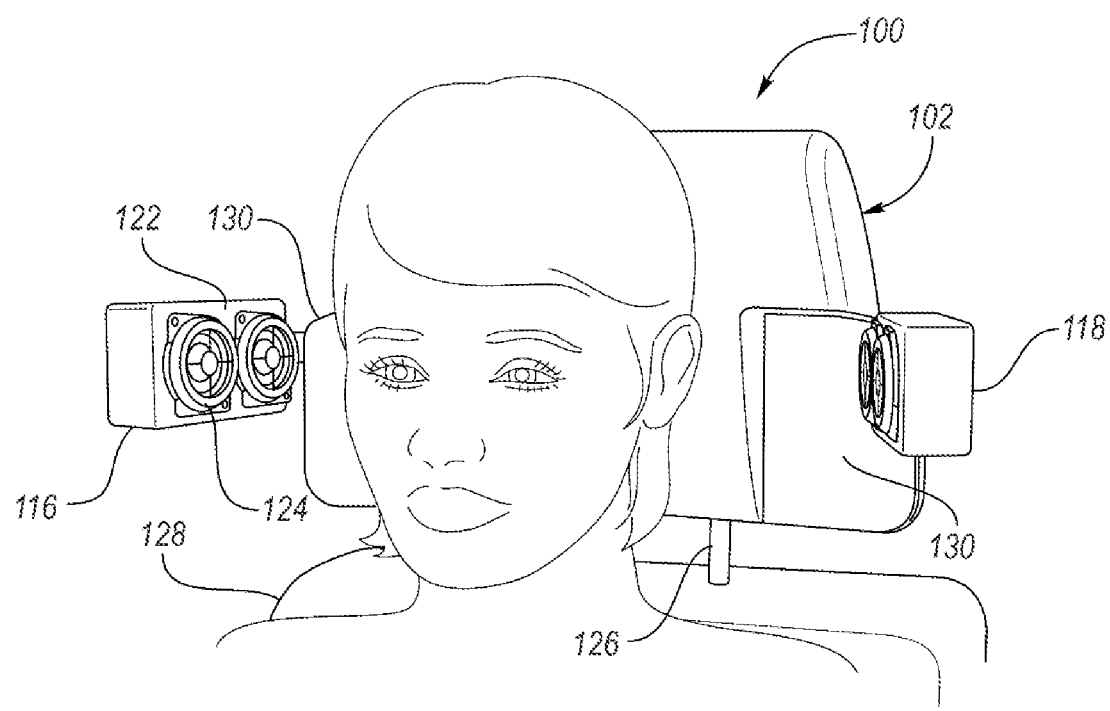
FIG. 11 illustrates a front perspective view of the headrest assembly and second extended position of the speaker modules of FIG. 9.
Figure 12:
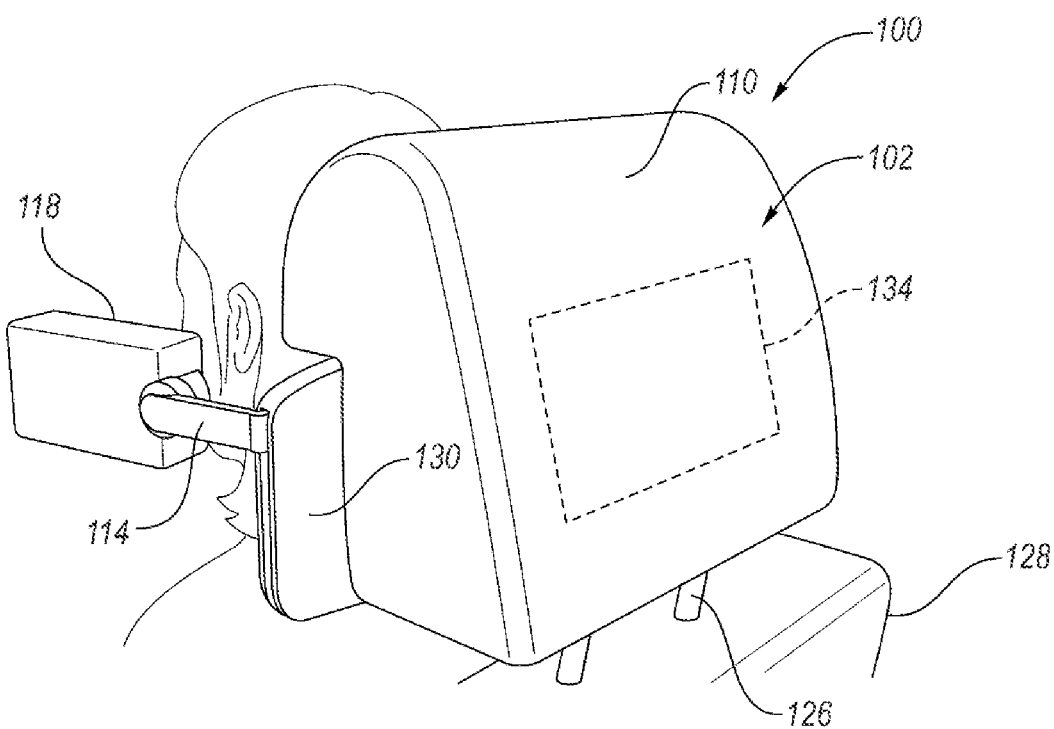
FIG. 12 illustrates a rear perspective view of the headrest assembly and second extended position of the speaker modules of FIG. 9.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Existing vehicle speaker arrangements cannot simultaneously satisfy all requirements of acoustics, safety, and user comfort while delivering multiple advanced audio features with their optimal performance. To address this challenge, embodiments disclosed herein provide a vehicle headrest assembly with configurable speakers which can be deployed into optimal arrangements for a plurality of audio modes. These modes include, but are not limited to, Individual Sound Zones (ISZ) mode, binaural mode, and surround sound mode.

In ISZ mode, sound energy is separated from other vehicle seats, thereby producing minimal disturbances for other listeners. In ISZ mode, the best tuning performance may be achieved by placing a speaker or a speaker array on each side of the head in a specific arrangement. In particular, on each side, the speakers may be located at chin level height while staying on the same vertical plane with the ears and tilted in such a way that the main broadcasting direction of speaker points to the chin or mouth of the head of the vehicle occupant. In such an arrangement, the driver's or passenger's head can rotate freely without a blocked view.

In binaural mode, the signals received by the listener's left and right ear are carefully controlled in order to render a three-dimensional sound image in perception for audio effects and immersion and may utilize techniques involving Head Related Transfer Function (HRTF). To achieve a satisfactory binaural rendering effect, a speaker or a speaker array may be placed on each side of the head facing the ears with the same height on the same vertical plane. In this arrangement, speakers produce acoustics around the head with a natural left-right ear cross talk cancellation for mid and high frequencies (>300 Hz), which is advantageous for further application of binaural signal processing techniques. However, such a speaker arrangement constrains the head movement and blocks the peripheral view, making it unsuitable for the driver, but acceptable for passengers to use.

In surround sound mode, speakers are placed near or inside the headrest, behind the listeners head. This arrangement offers comfort and safety and allows unrestricted use for the driver and passengers. This mode may be used in combination with other system speakers as a supplement instead of a stand-alone module.

Speakers having a fixed extended position do not allow for selection between different audio modes and suffer from ergonomic, safety, and regulatory issues when realized in the present day automotive environment. For example, speakers in a fixed extended position would prevent people from entering or exiting the vehicle, they can block most of the visual periphery of the occupants, and they may interfere with routine driving tasks. Having speaker modules in the desired locations for optimal performance in different audio modes is simply not feasible without a dynamic, moving solution. Embodiments disclosed herein allow the desired headrest speaker position to be achieved without restricting occupant movement, violating traffic or driving laws, or causing any discomfort to the occupants.

Embodiments disclosed herein provide a headrest assembly for a vehicle which employs speaker modules movable between retracted and extended positions. The speaker modules utilize motorized, actuator driven, spring driven or manual mechanisms for deployment. Three or more arrangements could be deployed as corresponding audio features and modes are activated, based on the use case. Furthermore, since some audio modes require more precise positioning in the speaker arrangement regarding the listener's head position to account for individual listener seating differences, a vehicle control unit in communication with the headrest assembly may have a memory device to store the user-specific parameters. After the initial adjustment of each user's first activation of each feature, a user profile may be established and can be retrieved in the future.

The disclosed embodiments allow every vehicle seat and associated headrest to be equipped with multiple advanced audio features and modes which can be activated by a vehicle occupant. The disclosed audio system allows a user to access multiple audio features in their optimal performance through different speaker arrangement deployment configurations which account for individual user's seating.

With reference to FIGS. 1-12, configurations for a headrest assembly 100 in a vehicle according to one or more embodiments are illustrated. As shown, the headrest assembly 100 includes a head support 102 having a front side 104, a back side 106, a left side 108, and a right side 110. A left support arm 112 is coupled to the left side 108 and a right support arm 114 is coupled to the right side 110. A left speaker module 116 is coupled to the left support arm 112 and a right speaker module 118 is coupled to the right support arm 114, the left and right speaker modules 116, 118 each including a housing 120 having a front face 122 with at least one speaker 124 mounted therein for generating audio output. The speaker modules 116, 118 are arranged to be disposed laterally with respect to the occupant's head, on opposite sides thereof. The headrest assembly 100 may include headrest mounts 126 extending from the bottom of the head support 102 to allow for mounting of the head support 102 to a vehicle seat 128. In alternate embodiments, the headrest assembly 100 may be part of the vehicle seat 128.

The left and right support arms 112, 114 are arranged to position the left and right speaker modules 116, 118 to provide a plurality of audio modes including a retracted position with respect to the head support 102 to provide a surround sound mode, a first extended position with respect to the head support 102 to provide an individual sound zone (ISZ) mode, and a second extended position with respect to the head support 102 to provide a binaural mode. The support arms 112, 114 may include one or more arms, linkages, or other mechanical structures that may support and position the speaker modules 116, 118 in retracted or extended positions with respect to the head support 102. The support arms 112, 114 may be hinged, and the left and right support arms 112, 114 may be rotatably connected to the left and right speaker modules 116, 118, respectively. The head support 102 may include a flange 130 on each of the left and right sides 108, 110, each flange 130 having a channel 132 along which the left and right support arms 112, 114 can translate. While the support arms 112, 114 and speaker modules 116, 118 are shown and described herein as being located on both the left and right sides 108, 110 of the head support 102, it is understood that alternatively only a single support arm 112, 114 and corresponding single speaker module 116, 118 on one of the left side 108 or right side 110 could be employed.

Figure 14:
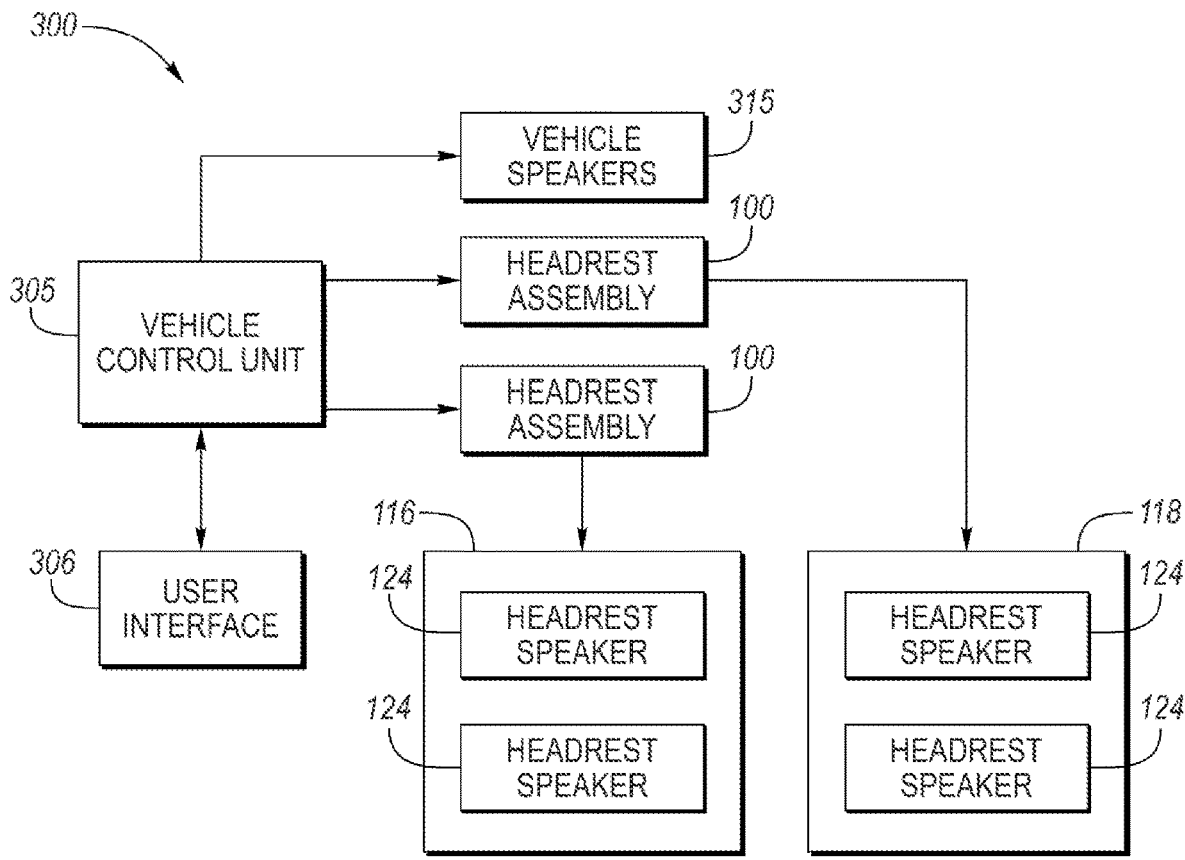
FIG. 14 depicts a graphical representation of an audio system for a vehicle according to one or more embodiments.

The speaker modules 116, 118 may be utilized in addition to and/or independently from other vehicle speakers 315 (FIG. 14). A single speaker 124, two speakers 124, or more than two speakers 124 within each speaker module 116, 118 is contemplated. Each speaker 124 may optionally operate with its own sealed acoustic volume so that they do not interfere with each other to the largest possible extent. When two or more speakers 124 are used, the speakers 124 may have different spectral characteristics (frequency ranges). For example, in order to improve the low frequency separation of different sound zones, one of the speakers 124 may be a lower-frequency speaker such as a woofer or a suitable midrange speaker. The other speaker 124 may be a higher-frequency speaker such as a suitable midrange speaker or tweeter. Of course, these configurations are merely exemplary, and the speaker modules 116, 118 are not limited to the housing 120 shape or the number and placement of the speakers 124 shown or described herein. The dimensions of the speaker modules 116, 118 and the number and characteristics of the included speakers 124 may be selected to optimize audio features and performance along with ergonomics for the vehicle occupants.

The headrest assembly 100 may employ mechanical actuation of the support arms 112, 114 (e.g., motorized, actuator driven, spring driven and/or retraction, etc.) to move the physical orientation of the speaker modules 116, 118 to enable adaptive audio performance. The support arms 112, 114 may be operably connected to an actuator 134, such as a motor, which may be disposed within the head support 102. The actuator 134 may be configured to be operably connected to a power source (not shown), such as associated with the headrest assembly 100 or the vehicle seat 128, to provide power to the actuator 134. The support arms 112, 114 may automatically, electrically, hydraulically, or mechanically be extended, retracted, or tilted along one, two or three axes. While the disclosed embodiments are described as utilizing mechanical operation to extend and retract the speaker modules 116, 118 with respect to the head support 102 via the support arms 112, 114, it may be appreciated that one or more embodiments may allow for push button and/or manual (e.g., by hand) extension and retraction of the support arms 112, 114 and speaker modules 116, 118.

The support arms 112, 114 are configured to position the speaker modules 116, 118 in a plurality of arrangements, including a retracted position, a first extended position, and a second extended position. FIGS. 1-4 depict the headrest assembly 100 with the support arms 112, 114 and speaker modules 116, 118 in a retracted position. In the retracted position, the front face 122 of the speaker modules 116, 118 may be oriented forward and generally parallel to the front side 104 of the head support 102. As such, in the retracted position, the speaker modules 116, 118 may direct output in at a least a forward direction. The head support 102 may include a recessed portion 136 on each of the left and right sides 108, 110 arranged to at least partially receive the left and right speaker modules 116, 118, respectively, in the retracted position.

The retracted position of the speaker modules 116, 118, and one or more control signals, may allow for a surround sound mode. In this surround sound configuration, the speaker modules 116, 118 may be adjacent to or retracted within the head support 102, firing forward, and contributing to the overall sense of space in the vehicle. The retracted position directs speaker output more generally towards the seat occupant and vehicle cabin to provide an acoustic landscape having a larger feel, enhancing the audio experience for all occupants in the vehicle. The recessed portions 136 may allow for storage of the support arms 112, 114 and the speaker modules 116, 118 when in the retracted position, such that the front face 122 of each speaker module 116, 118 may be generally flush with the head support 102.

FIGS. 5-8 depict the headrest assembly 100 with the side support arms 112, 114 and the speaker modules 116, 118 in a first extended position. By way of example, the support arms 112, 114 and the speaker modules 116, 118 may extend out from the head support 102 to allow for the speaker modules 116, 118 to be directed towards the occupant's ears. In the first extended position, the speaker modules 116, 118 may extend forward from a bottom portion 138 of the head support 102 with the front face 122 of each of the speaker modules 116, 118 oriented inward.

The first extended position of the speaker modules 116, 118, and one or more control signals, may allow for an ISZ mode. In the ISZ mode, sound from the speaker modules 116, 118 may have a more direct acoustic transmission path to the occupant's ears. As shown, the speaker modules 116, 118 may be located at chin level height while staying on the same vertical plane with the ears and tilted in such a way that the main broadcasting direction of the speaker modules 116, 118 points to the chin or mouth of the vehicle occupant, offering an unobstructed panoramic view for the occupant. The position of the speaker modules 116, 118 may positively influence the amount of passive acoustic isolation or separation between occupants, an important factor in isolation audio configurations. The ISZ mode may deliver more focused audio reproduction to the primary listener's audio playback system, while simultaneously attenuating some of the acoustic energy from other seat's speakers. In certain embodiments, audio may be routed to specific occupants, and the first extended position may allow for one or more occupants to have a dedicated audio output. The ISZ mode may allow for an occupant to listen to a desired audio channel without affecting other occupants in the vehicle.

FIGS. 9-12 depict the headrest assembly 100 with the support arms 112, 114 and the speaker modules 116, 118 in a second extended position. By way of example, the support arms 112, 114 and the speaker modules 116, 118 may extend out from the head support 102 to allow for the speaker modules 116, 118 to be directed towards occupant ears. In the second extended position, the speaker modules 116, 118 may extend forward from a middle portion 140 of the head support 102 with the front face 122 of each of the speaker modules 116, 118 oriented inward.

The second extended position of the speaker modules 116, 118, and one or more control signals, may allow for a binaural mode. In the binaural mode, sound from the speaker modules 116, 118 may be focused towards an occupant's ears, generally in-line with the occupant's ear canal, providing a more direct acoustic transmission path. As shown, the speaker modules 116, 118 may be located on each side of the head facing the ears with the same height on the same vertical plane. The position of the speaker modules 116, 118 may positively influence the amount of passive acoustic separation between occupant's left and right ears, an important factor in implementing binaural cross talk cancellation. The binaural mode may utilize techniques involving active cross talk cancellation and Head Related Transfer Function (HRTF) to render a three-dimensional sound image for the occupant to perceive.

Figure 13:
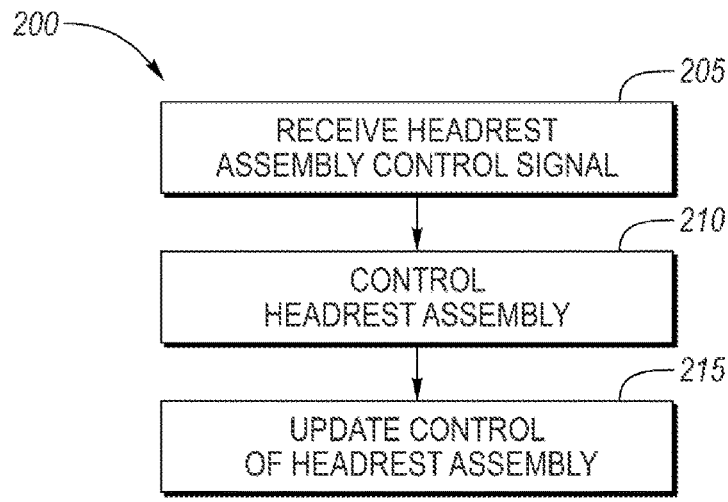
FIG. 13 depicts a process for headrest assembly control according to one or more embodiments.

FIG. 13 depicts a process for control of a headrest assembly 100 according to one or more embodiments. Process 200 may be employed by a vehicle control unit 305 (FIG. 14), such as an infotainment unit, head unit, and/or other control unit to control one or more headrest assemblies 100 and headrest elements (e.g., speaker modules 116, 118). Process 200 may be initiated by receiving a headrest assembly control signal at block 205. In one embodiment, headrest assembly control signals may be one or more control signals to direct position of the support arms 112, 114 and speaker modules 116, 118 to at least one of a first extended position, second extended position, and a retracted position. In addition to control of position, headrest assembly control signals may relate to audio data, speaker control, etc. Furthermore, control of support arm and speaker module position can be coupled with other seat-based position movements, for example headrest height, seat recline, etc.

At block 210, the headrest assembly 100 may be controlled based on the control signal received at block 205. In one exemplary embodiment, headrest assembly control includes moving the support arms 112, 114 and the speaker modules 116, 118 from a current position to a second position (e.g., retracted position, first extended position, second extended position). By way of example, the support arms 112, 114 and speaker modules 116, 118 may be controlled to move from a retracted to an extended position, or vice versa, or between different extended positions. In some cases, the control signal may be generated by occupant selection of a mode, such as surround sound mode, ISZ mode, or binaural mode, that directs the headrest assembly 100 to control the position of the support arms 112, 114 and the speaker modules 116, 118. Occupant selections may be detected based on activation of vehicle buttons and/or selections of an infotainment or other user interface 306 (FIG. 14). Although the support arms 112, 114 and the speaker modules 116, 118 are described herein as moving in a coordinated fashion as a set, independent control and movement of the support arms 112, 114 and speaker modules 116, 118 or the movement of only one support arm 112, 114 and corresponding speaker module 116, 118 are also contemplated.

Controlling can include arranging the support arms 112, 114 and the speaker modules 116, 118 in one or more of a first extended position, a second extended position (different from the first extended position), and a retracted position. Controlling can include arranging the speaker modules 116, 118 in one or more of a surround sound mode, ISZ mode, and binaural mode. Controlling can include positioning of the support arms 112, 114 and the speaker modules 116, 118 based on a vehicle parameter including at least one of vehicle shutdown, vehicle operational mode, occupant detection, and/or driving condition. Controlling can include moving the support arms 112, 114 and the speaker modules 116, 118 automatically between audio modes. Additionally, the position of the support arms 112, 114 and the speaker modules 116, 118 could be adjusted continuously to enable advanced head-related speaker positioning and tracking.

At block 215, process 200 can update control of the headrest assembly 100 and one or more headrest elements (e.g., support arms 112, 114 and speaker modules 116, 118). Process 200 allows for continuous, or regular, monitoring of vehicle control signals such that occupant selections or vehicle events can trigger modifying a position of the support arms 112, 114 and speaker modules 116, 118. In one exemplary embodiment, vehicle shutdown or certain operational modes may control the position of the support arms 112, 114 and the speaker modules 116, 118. For example, shutdown of the vehicle may automatically direct the support arms 112, 114 and the speaker modules 116, 118 to a retracted position. Alternatively, occupant detection may result in positioning of the support arms 112, 114 and speaker modules 116, 118 based on one or more occupant presets. According to another embodiment, driving conditions, such as highway vs. local driving, may prompt the vehicle control unit 305 (FIG. 14) to position the support arms 112, 114 and the speaker modules 116, 118.

FIG. 14 depicts an audio system 300 according to one or more embodiments. Audio system 300 may relate to a vehicle configuration, such as an automobile or passenger vehicle configuration. According to one embodiment, a vehicle control unit 305, such as a vehicle infotainment unit, is in electrical communication with one or more headrest assemblies 100. The vehicle control unit 305 may provide one or more of driver assistance, navigation, media, and vehicle control features. In one embodiment, audio system 300 includes a user interface 306 which may be employed to provide one or more commands or control signals to the vehicle control unit 305, including settings for headrest elements (e.g., support arms 112, 114 and speaker modules 116, 118). The actuator 134 may be in electrical communication with the vehicle control unit 305 and a power source (not shown) for causing movement of the left and right support arms 112, 114 and coupled speaker modules 116, 118. Commands may be directed to one or more of directionality and movable element control as described herein. The user interface 306 may include a display and one or more input controls, such as a touch screen display to present a user interface for the vehicle control unit 305 and display of input and adjustment commands.

In one or more embodiments, the vehicle control unit 305 drives one or more vehicle speakers 315. According to another embodiment, the vehicle control unit 305 controls one or more headrest assemblies 100. The headrest assemblies 100 may include one or more speaker modules 116, 118, each including one or more speakers 124, and one or more support arms 112, 114 to position the speaker modules 116, 118. According to another embodiment, the vehicle control unit 305 may be configured to control one or more of headrest assemblies 100 to allow for one or more adaptive audio modes, such as surround sound mode, ISZ mode, or binaural mode. According to another embodiment, the speakers 124 may operate as a speaker array. The vehicle control unit 305 may be capable of controlling the left speaker module 116 independent from the right speaker module 118. The vehicle control unit 305 may include a processor to perform one or more functions which may be stored in a memory module of the vehicle control unit 305.

Figure 15:
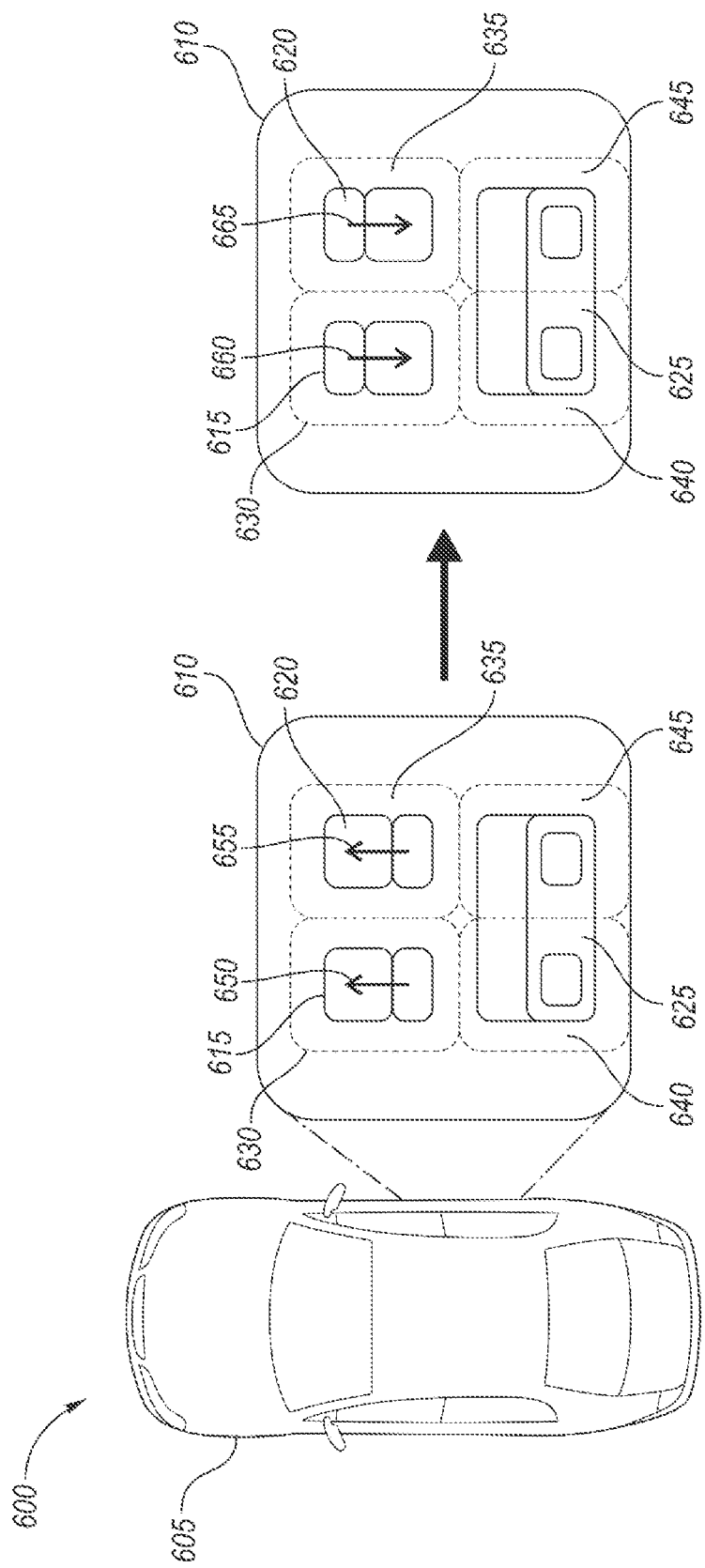
FIG. 15 depicts a vehicle cabin configuration according to one or more embodiments.

FIG. 15 depicts a vehicle cabin configuration according to one or more embodiments. Vehicle cabin configuration 600 for a vehicle 605 may allow for one or more sound zones and sound configurations. The cabin 610 of the vehicle 605 includes a plurality of seats. According to one embodiment, individual sound zones may be provided by employing configurations of the headrest assembly 100 and speaker modules 116, 118 for vehicle seats. Front seats, such as the driver seat 615 and the passenger seat 620, may each be associated with a dedicated zone. Passenger seats, such as the rear seat 625, may have multiple zones. The rear seat 625 is shown having a two headrest configuration for a bench seat but could be configured with three headrests. A driver zone 630 and a passenger zone 635 are shown for the driver seat 615 and the passenger seat 620, respectively. Each zone relates to an area of the vehicle 605 where sound may be directed and speaker module 116, 118 configurations adaptively controlled to allow for a surround sound, ISZ, or binaural configuration. Rear zones 640 and 645 are shown for the left and right sections of the rear seat 625. As shown in FIG. 15, each seat and zone identified allows for the headrest assembly 100 to be configured to provide audio output in at least one of the surround sound, ISZ, or binaural configurations.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A headrest assembly for a vehicle, comprising:
    a head support having a front side, a back side, a left side, and a right side;
    a left support arm coupled to the left side and a right support arm coupled to the right side; and
    a left speaker module coupled to the left support arm and a right speaker module coupled to the right support arm, the left and right speaker modules each including a housing having a front face with at least one speaker mounted therein for generating audio output, the left and right support arms arranged to position the left and right speaker modules to be movable between a retracted position with respect to the head support to provide a surround sound mode, a first extended position at a bottom portion of the head support to provide an individual sound zone (ISZ) mode, and a second extended position at a middle portion of the head support to provide a binaural mode.

2. The headrest assembly of claim 1, wherein the left and right support arms are operably connected to an actuator disposed within the head support.

3. The headrest assembly of claim 1, wherein the left and right support arms are hinged.

4. The headrest assembly of claim 1, wherein the head support includes a flange on each of the left and right sides, each flange having a channel along which the left and right support arms can translate.

5. The headrest assembly of claim 1, wherein the left and right support arms are rotatably connected to the left and right speaker modules, respectively.

6. The headrest assembly of claim 1, wherein in the retracted position, the front face of the left and right speaker modules is oriented forward and generally parallel to the front side of the head support.

7. The headrest assembly of claim 1, wherein the head support includes a recessed portion on each of the left and right sides arranged to at least partially receive the left and right speaker modules, respectively, in the retracted position.

8. The headrest assembly of claim 1, wherein in the first extended position, the left and right speaker modules extend forward from the bottom portion of the head support with the front face of each of the left and right speaker modules oriented inward.

9. The headrest assembly of claim 1, wherein in the second extended position, the left and right speaker modules extend forward from the middle portion of the head support with the front face of each of the left and right speaker modules oriented inward.

10. The headrest assembly of claim 1, wherein the left and right speaker modules each include a first speaker and a second speaker, the second speaker having a different frequency range than the first speaker.

11. A headrest assembly for a vehicle, comprising:
    a head support having a front side, a back side, a left side, and a right side;
    a left support arm coupled to the left side and a right support arm coupled to the right side; and a left speaker module coupled to the left support arm and a right speaker module coupled to the right support arm, the left and right speaker modules each including a housing having a front face with at least one speaker mounted therein for generating audio output, the left and right support arms arranged to position the left and right speaker modules to be movable between a retracted position with respect to the head support wherein the front face of the left and right speaker modules is oriented forward and generally parallel to the front side of the head support, in a first extended position at a bottom portion of the head support wherein the left and right speaker modules extend forward from the bottom portion of the head support with the front face of each of the left and right speaker modules oriented inward, and in a second extended position at a middle portion of the head support wherein the left and right speaker modules extend forward from the middle portion of the head support with the front face of each of the left and right speaker modules oriented inward.

12. The headrest assembly of claim 11, wherein the retracted position corresponds to a surround sound mode, the first extended position corresponds to an ISZ mode, and the second extended position corresponds to a binaural mode.

13. An audio system for a vehicle, comprising:
at least one headrest assembly including
a head support having a front side, a back side, a left side, and a right side;
a left support arm coupled to the left side and a right support arm coupled to the right side; and
a left speaker module coupled to the left support arm and a right speaker module coupled to the right support arm, the left and right speaker modules each including a housing having a front face with at least one speaker mounted therein for generating audio output; and
a vehicle control unit in electrical communication with the at least one headrest assembly, the vehicle control unit configured to position the left and right speaker modules to be movable between a retracted position with respect to the head support to provide a surround sound mode, a first extended position at a bottom portion of the head support to provide an ISZ mode, and a second extended position at a middle portion of the head support to provide a binaural mode.

14. The audio system of claim 13, wherein the vehicle control unit includes a user interface configured to generate a control signal for movement of the left and right support arms and coupled left and right speaker modules in response to user input selecting one of the plurality of audio modes.

15. The audio system of claim 13, further comprising an actuator disposed within the head support and operably connected to the left and right support arms, the actuator in electrical communication with the vehicle control unit for causing movement of the left and right support arms.

16. The audio system of claim 13, wherein in the retracted position, the front face of the left and right speaker modules is oriented forward and generally parallel to the front side of the head support.

17. The audio system of claim 13, wherein in the first extended position, the left and right speaker modules extend forward from the bottom portion of the head support with the front face of each of the left and right speaker modules oriented inward.

18. The audio system of claim 13, wherein in the second extended position, the left and right speaker modules extend forward from the middle portion of the head support with the front face of each of the left and right speaker modules oriented inward.

19. The audio system of claim 13, wherein the vehicle control unit is capable of controlling the left speaker module independent from the right speaker module.

20. The audio system of claim 13, wherein the vehicle control unit is arranged to position the left and right support arms and coupled left and right speaker modules based on a vehicle parameter including at least one of vehicle shutdown, vehicle operational mode, occupant detection, or driving condition.

* * * * *